Jan. 6, 1970　　　　P. E. HOROSHAK　　　　3,488,024
ANIMAL SUPPORT BRACKET
Filed June 7, 1967
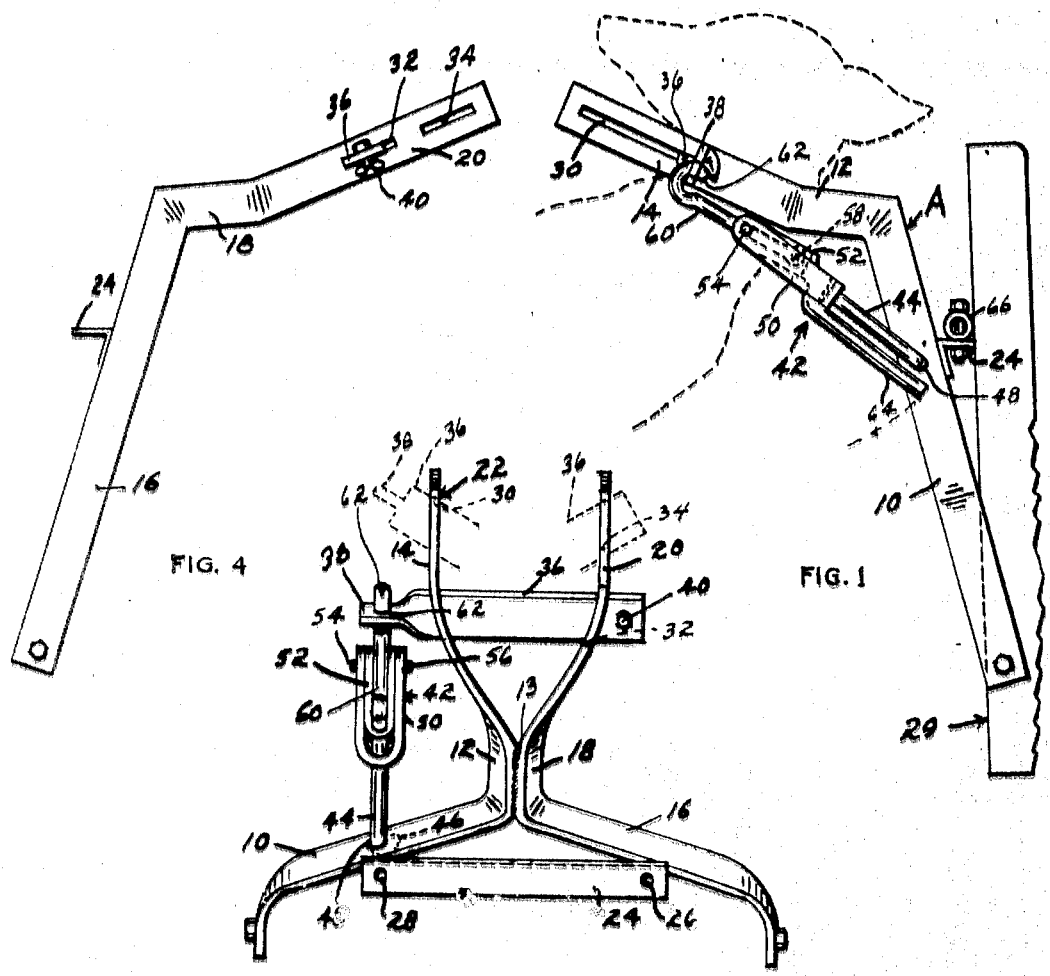
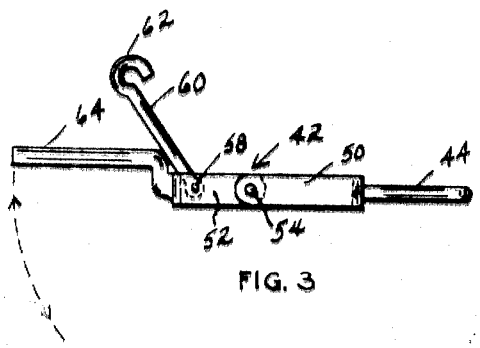
FIG. 3
INVENTOR
PAUL E. HOROSHAK
BY Caswell, Lagaard & Wicks
ATTORNEYS

# United States Patent Office 3,488,024
Patented Jan. 6, 1970

1

3,488,024
ANIMAL SUPPORT BRACKET
Paul E. Horoshak, Box 42, Eveleth, Minn. 55734
Filed June 7, 1967, Ser. No. 644,347
Int. Cl. A47f 5/00; A47h 1/10
U.S. Cl. 248—316                                    1 Claim

ABSTRACT OF THE DISCLOSURE

The bracket includes a pair of arms for connection with a vehicle. The arms converge together at the upper ends and extending from the arms at the point of convergence, is a yoke into which the neck of an animal is positioned. Further provided is a closure bar pivotally mounted at one end on one arm of the yoke with the other end of the closure bar adjustably connected to the other arm of the yoke. The closure bar is brought from an open position on the yoke to a closed position by a throw clamp connected to the closure bar and one of the pair of arms.

SUMMARY OF THE INVENTION

The invention relates broadly to brackets and more specifically to a bracket mountable on a snowmobile or the like and with which a deer or other animal of comparable size may be towed.

It is an object of the invention to provide a bracket having a yoke in which the neck of an animal may be positioned together with a closure bar which is movable from an open position to a locked closed position upon the neck of an animal. It is a further object to provide a closure bar which is adjustable upon the yoke whereby animals of different size may be towed and two small animals towed in the same yoke.

It will not be here attempted to set forth and indicate all of the various objects and advantages incident to the invention, but other objects and advantages will be referred to in or else will become apparent from that which follows.

The invention will appear more clearly from the following detailed description when taken in connection with the accompanying drawings, showing by way of example a preferred embodiment of the inventive idea wherein like numerals refer to like parts throughout.

In the drawings forming part of this application:

FIGURE 1 is a side elevational view of the bracket mounted on the rear of a seat of a snowmobile with the neck of a deer secured in the bracket and shown in broken lines.

FIGURE 2 is a top plan view of the bracket.

FIGURE 3 is a side elevational view of the throw clamp in open position and removed from the bracket.

FIGURE 4 is a side elevational view opposite to that shown in FIGURE 1.

Referring to the drawings in detail, the bracket A includes the first arm portion 10 which terminates at its upper end in a short relatively horizontal portion 12. The horizontal portion 12 terminates at its outer end in the arcuate half yoke arm portion 14. Further provided is a second arm portion 16 which terminates at its upper end in a short relatively horizontal portion 18. The horizontal portion 18 terminates at its outer end in the arcuate half yoke arm portion 20. The horizontal portions 12 and 18 are welded together, as at 13, with the half yoke portions in the same plane to form yoke 22. The arms 10 and 16 form a support for the yoke 22.

The first and second arm portions 10 and 16 have secured thereto the horizontal brace member 24 formed with the holes 26 and 28 used for connection with the seat 29 of a snowmobile or the like as hereinafter set forth.

2

The numeral 30 designates a slot formed in the arcuate arm 14, and formed in the arcuate arm 20 is the first and second slots 32 and 34, respectively.

Further provided is the closure bar 36 which has formed on one end thereof the right angular end shoulder portion 38 and extending through the opposite end of the closure bar is the nut-equipped bolt 40. The closure bar 36 is placed in operative position by first extending the same through the slot 30 of arcuate arm portion 14 and then through first slot 32 of arcuate arm portion 20, FIGURE 2. The nut-equipped bolt 40 is then secured in place, and as a result, the closure bar is mounted on the yoke 22. The closure bar can alternatively be mounted in the second slot 34 in the same manner to allow greater capacity in the yoke. The numeral 42 designates a conventional clamping throw which includes the base rod portion 44 formed with the hook 46 on the outer end which is engaged in the hole 48 formed in the first arm portion 10. Secured to the inner end of the base rod 44 is the first clamp yoke 50, and further provided is the second clamp yoke 52 pivotally connected at the outer free ends to the outer free ends of the first yoke 50 by means of the pins 54 and 56. Pivotally connected at its inner end to a point within the second yoke 52 by means of the pin 58 is the hook arm 60 formed with hook 62. The hook 62 of the arm 60 is hooked into the hole 62 formed in the shoulder portion 38 of the closure bar 36.

Secured to the second clamping yoke 52, is the clamp arm 64 which is used to actuate the clamp throw 42 into an open or closed position. In FIGURES 1 and 2, the clamp throw is in a closed position. The clamp throw is opened by pulling downwardly on the clamp arm 64 and pivoting the same on pins 54 and 56 to the position of FIGURE 3. As a result, the closure bar is moved from the position in the rear end of the slot 30 to the forward open position at the rear end of the slot 30 whereby the head of an animal can be inserted in the yoke 22 and within the closure bar. To secure the animal's head, the throw 42 is closed by returning the clamp arm 64 to the closed position of FIGURES 1 and 2.

The brace member 24 is secured to the horizontal brace member 66 of the seat 29, and the lower ends of the arms 10 and 16 are secured to the sides of the seat 29.

The invention is not to be understood as restricted to the details set forth since these may be modified within the scope of the appended claim without departing from the spirit and scope of the invention.

Having thus described the invention, what is claimed as new and desired to be secured by Letters Patent is:

1. An adjustable clamping bracket for towing animals on a snowmobile comprising:
   (a) a support including a pair of arms joined at the inner ends thereof with the outer portions thereof diverging downwardly and outwardly,
   (b) means carried by said support for receiving the neck of an animal,
   (c) means carried by said neck receiving means for clamping the neck of an animal in said neck receiving means,
   (d) means for mounting said support on a vehicle,
   (e) said neck receiving means being a yoke member connected to the juncture of the inner ends of said arms,
   (f) said clamping means including a closure bar pivotally mounted on said yoke, and means for holding said closure bar to close off said yoke and maintain the neck of an animal in said yoke member against displacement,
   (g) said yoke including means for adjustably positioning said closure bar thereon,
   (h) said means for holding said closure bar to close off said yoke including a throw connected to said bar and said support and extendable from a shortened over center closed position to a lengthened open position.

References Cited

UNITED STATES PATENTS

| | | | |
|---|---|---|---|
| 2,593,559 | 4/1952 | Heldenbrand | 119—99 |
| 2,867,402 | 1/1959 | Graybill et al. | 224—42.03 |
| 3,137,030 | 6/1964 | Varner | 17—44.2 |
| 3,342,441 | 9/1967 | Danielson | 248—316 |

FOREIGN PATENTS 210,277   1/1924   Great Britain.

ROY D. FRASIER, Primary Examiner

J. F. FOSS, Assistant Examiner

U.S. Cl. X.R.

17—44.2, 224—42.45